UNITED STATES PATENT OFFICE.

ISAIAH L. ROBERTS, OF NEW YORK, N. Y.

PROCESS OF MANUFACTURING CALCIUM CARBID.

SPECIFICATION forming part of Letters Patent No. 708,921, dated September 9, 1902.

Application filed March 18, 1897. Serial No. 628,197. (No specimens.)

*To all whom it may concern:*

Be it known that I, ISAIAH L. ROBERTS, of the city, county, and State of New York, have invented a new and useful Improvement in Processes of Manufacturing Calcium Carbid, of which the following is a full, true, and exact description.

In the process of manufacturing calcium carbid the materials hitherto used have been a combination of pulverized coke and lime. I have discovered that coke is a disadvantageous body to use for this purpose. By reason of its low specific gravity it tends as soon as the lime is melted to float upon the surface of the lime and to only in part unite with the lime, there being a tendency in the formation of the ingot to have the lower part substantially lime with some carbid admixed therewith and the upper part coke with some carbid admixed therewith. Furthermore, in the process of making calcium carbid as ordinarily practiced the conversion is practically carried on in the presence or the neighborhood of the atmosphere, and large amounts of coke-dust are driven into the air, thereby necessitating the wearing of masks by the workmen. Anthracite coal being of a higher specific gravity and also not having the tendency to fly into dust that coke has, largely diminishes and tends to obviate this difficulty.

I have discovered that I can substitute with advantage finely-ground anthracite coal for coke. The anthracite coal having a higher specific gravity in practice remains mingled with the lime, and the entire body melted is substantially converted into carbid. This carbid also when removed from the furnace does not so readily burn upon its surface as does the carbid produced from coke, which seems to be in some respects more porous, allowing greater access of air. However this may be, the fact is as I have stated. I propose, therefore, to substitute in the processes of manufacturing carbid for finely-ground coke finely-ground anthracite coal. I thus utilize a much cheaper material and simultaneously obtain an increased yield in carbid, as I have demonstrated by actual experiments. The proportions of anthracite to lime may be the same as those ordinarily employed, though I have found that a somewhat less proportion of anthracite works satisfactorily.

What I claim as my invention, and desire to secure by Letters Patent, is—

1. The process of manufacturing carbid of calcium which consists in the admixture of lime and anthracite coal.

2. The process of manufacturing carbid of calcium which consists in the admixture of lime and finely-granulated anthracite coal.

3. The process of manufacturing carbid of calcium which consists in the admixture of molten lime and anthracite coal.

In testimony whereof I have signed my name to this specification in the presence of two subscribing witnesses.

ISAIAH L. ROBERTS.

Witnesses:
H. COUTANT,
W. LAIRD GOLDSBOROUGH.